US009664152B2

(12) United States Patent
Zoner et al.

(10) Patent No.: US 9,664,152 B2
(45) Date of Patent: May 30, 2017

(54) INDUCTION ASSEMBLY AND SYSTEM FOR A SUPERCHARGED INTERNAL COMBUSTION ENGINE, AND METHOD FOR ASSEMBLY FOR THE SAME

(71) Applicant: Callaway Cars, Inc., Old Lyme, CT (US)

(72) Inventors: Michael A. Zoner, Clinton, CT (US); E. Reeves Callaway, III, Newport Beach, CA (US); Patrick A. Hodgins, Detroit, ME (US); Scott L. Rawling, Seymour, CT (US); Peter R. Callaway, Temecula, CA (US)

(73) Assignee: CALLAWAY CARS, INC., Old Lyme, CT (US)

( * ) Notice: Subject to any disclaimer, the term of this patent is extended or adjusted under 35 U.S.C. 154(b) by 0 days.

(21) Appl. No.: 15/029,008
(22) PCT Filed: Apr. 17, 2015
(86) PCT No.: PCT/US2015/026479
§ 371 (c)(1),
(2) Date: Apr. 13, 2016
(87) PCT Pub. No.: WO2015/179048
PCT Pub. Date: Nov. 26, 2015

(65) Prior Publication Data
US 2016/0237961 A1 Aug. 18, 2016

Related U.S. Application Data
(60) Provisional application No. 61/981,136, filed on Apr. 17, 2014, provisional application No. 62/019,275, filed on Jun. 30, 2014.

(51) Int. Cl.
F02M 35/10 (2006.01)
F02M 35/116 (2006.01)
(Continued)

(52) U.S. Cl.
CPC ... *F02M 35/10157* (2013.01); *F02B 29/0412* (2013.01); *F02B 29/0437* (2013.01);
(Continued)

(58) Field of Classification Search
CPC .......... F02B 33/00; F02B 29/04; F02B 27/02; F02B 33/44; F02M 35/00
(Continued)

(56) References Cited

U.S. PATENT DOCUMENTS 6,029,637 A 2/2000 Prior
7,469,690 B1 12/2008 Kavadeles
(Continued)

OTHER PUBLICATIONS

PCT/US2015/026479, International Search Report and Written Opinion mailed Nov. 25, 2015, 11 pages—English.

*Primary Examiner* — Mark A Laurenzi
*Assistant Examiner* — Shafiq Mian
(74) *Attorney, Agent, or Firm* — Andrew F. Young, Esq.; Lackenbach Siegel, LLP

(57) ABSTRACT

An induction system for a supercharged internal V-type combustion engine includes a monolithic continuous unitary casting housing a supercharger with a rotor and gear assembly operative to discharge pressurized air to a common bounding receiving plenum, through a first slidably-removable intercooler providing a first cooling, and then to a pair of second side intercoolers providing a second cooling within the bounded plenum and in fluid communication therewith. First and second intercoolers are secured within the monolithic housing. The monolithic housing provides a robust and stable housing of light weight and allows an exterior air cooling as well. Side walls of the supercharger are separate from and are spaced from air intake runners of a cylinder block. Air in the plenum is additionally cooled by convective surface cooling while being guided in an appropriate direction. The intercoolers are plumbed in parallel allowing for enhanced temperature management of the air flow in combination with the convective cooling. The mono- (Continued)

lithic housing includes rib elements for sound attenuation and strength while minimizing weight. This arrangement allows for enhanced cooling, and simplifies manufacture and service.

8 Claims, 21 Drawing Sheets

(51) Int. Cl.
  *F02B 29/04*   (2006.01)
  *F02B 33/36*   (2006.01)
  *F02M 35/16*   (2006.01)

(52) U.S. Cl.
  CPC ........... *F02B 33/36* (2013.01); *F02M 35/116* (2013.01); *F02M 35/161* (2013.01); *Y02T 10/144* (2013.01); *Y02T 10/146* (2013.01)

(58) Field of Classification Search
  USPC ................................................ 123/563, 561
  See application file for complete search history.

(56) References Cited

U.S. PATENT DOCUMENTS

| | | | |
|---|---|---|---|
| 2007/0107704 A1 | 5/2007 | Billings et al. | |
| 2009/0071450 A1* | 3/2009 | Doring | F02B 29/0412 123/563 |
| 2010/0258096 A1 | 10/2010 | Frank et al. | |
| 2011/0277709 A1 | 11/2011 | Liimatta | |
| 2012/0201709 A1* | 8/2012 | Suzuki | F01C 21/10 418/83 |

* cited by examiner

INDUCTION ASSEMBLY AND SYSTEM FOR A SUPERCHARGED INTERNAL COMBUSTION ENGINE, AND METHOD FOR ASSEMBLY FOR THE SAME

CROSS REFERENCE TO RELATED APPLICATIONS

This application claims priority to and is a §371 national phase of Ser. PCT/US2015/026479 filed Apr. 17, 2015, which in turn claims priority from U.S. Prov. Ser. No. 62/019,275 filed Jun. 30, 2014 and U.S. Prov. Ser. No. 61/981,136 filed Apr. 17, 2014; the entire contents of each which are incorporated herein by reference.

FIGURE SELECTED FOR PUBLICATION

FIG. 21

BACKGROUND OF THE INVENTION

Field of the Invention

The present invention relates to an induction assembly and system for a supercharged internal combustion engine. More particularly, the present invention relates to an assembly and a system having a monolithic unitary cast housing securing a super charger assembly and three integrated intercooler assemblies allowing for both a variable rate convective heat transfer via air cooling of an exterior of the monolithic cast housing and an air cooling of pressurized discharge air discharged from the super charger assembly for combustion.

Description of the Related Art

Industrial applications of induction assemblies for supercharged internal combustion engines have included a plurality of complex air inlet runners and cylinder head attachments.

In one related matter in U.S. Pat. No. 6,029,637 (Prior), the entire contents of which is incorporated herein by reference, an induction assembly is provided with extended induction housing intakes related to a super charger arrangement. Here, the entrance of the intake runners is long extended providing great inconvenience in access, enhanced costs, and greater difficulty in disassembly and maintenance. Additionally as a detriment, the assembly cannot be provided in a single compact monolithic manner due to the long extended intakes and the requirement for differently shaped cylinder heads and accesses geometries.

Also in a similar detrimental arrangement is U.S. Pat. No. 7,426,921 (Billings, et al.), the entire contents of which is incorporated herein by reference, wherein a super charger arrangement is provided with a separate-piece-kit type of two-part air inlet casings that are bolted to a side of a rotor casing in combination with a top rotor casing cover member. The arrangement provided is substantially complex and is also weakened by positioning the separate two-part air inlet casings with bending moments being secured to the rotor casing only through a separate cover member. Several detriments to air flow, rigidity, and sound attenuation. Additionally, thermal release from pressurized air is greatly hampered limiting power gain substantively.

Accordingly, there is a need for an improved induction assembly and system for a supercharged internal combustion with enhanced process efficiencies and thermal release.

ASPECTS AND SUMMARY OF THE INVENTION

In response, it is now recognized that an induction system can be provided for a supercharged internal V-type combustion engine including a monolithic continuous unitary casting or housing for a supercharger with a rotor and gear assembly operative to discharge pressurized air to a common bounding receiving plenum, through a first slidably-removable intercooler providing a first cooling step, and then to a pair of second side intercoolers providing a second cooling step within the bounded plenum and in fluid communication therewith. First and second intercoolers are secured within the monolithic housing. The monolithic housing provides a robust and stable housing of light weight and compact shape. Side walls of the supercharger are separate from and are spaced from air intake runners of a cylinder block. Air in the plenum is additionally cooled by convective surface cooling of the unitary casting. The intercoolers are plumbed in parallel allowing for enhanced temperature management of the air flow in combination with the convective cooling. The monolithic housing includes a plurality of rib elements for enhanced laminar air flow cooling, sound attenuation, and strength while minimizing weight. This arrangement allows for enhanced cooling, and simplifies manufacture and service.

It is also recognized that the proposed invention additionally provides an enhanced assembly and service method, allowing a first main intercooler (which receives the most operational stress, to be slidably installed into and slidably removed from the single monolithic continuous unitary casting housing without demounting the monolithic housing from a v-type combustion engine. As a further enhancement, the proposed method of assembly and use allows for the insertion of the pair of side mounted intercoolers within the monolithic housing between the housing and runner set also allowing enhanced service and access during use.

Another proposed alternative and optional aspect to the present invention is that the single monolithic housing has a continuously bounded plenum chamber that operatively houses the central intercooler and the pair of side intercoolers within the same continuously bounded plenum chamber for enhanced and directed air flow.

In another alternative and optional aspect of the proposed invention, the monolithic housing includes inside-surface ribbing elements that provide for sound attenuation and enhanced laminar air flow while additionally enhancing the rigidity of the monolithic housing without requiring an increase in wall thickness. This bounded housing plenum houses the intercooler cores and the supercharger assembly for enhanced rigidity and a robust structure.

It is another alternative and optional aspect of the present invention that the monolithic unitary housing houses provisions for a rotating supercharger assembly with rear-exit location, a central intercooler assembly with rear-exit location, and readily accessed fluid flows and runner assemblies for enhanced access and compact shape.

The proposed assembly and system allow a variable rate convective heat transfer cooling of the combustion engine via convective external air cooling of the monolithic unitary housing and three separate, in parallel, air-to-water intercooler systems bounded within the monolithic unitary housing. Water flow through the three intercoolers (which are heat exchangers) is plumbed in parallel and discharged to a unitary heat exchanger (e.g., radiator) for heat transfer to ambient air. Water is supplied by a reflowing standalone cooling pump and reservoir system.

In another alternative and optional aspect of the proposed invention provides an induction assembly for a supercharged internal combustion engine comprising: a monolithic continuous unitary housing member, the monolithic housing member continuously bounding a bounded super charger rotor portal, a super charger access portal, a first central intercooler portal, and opposed second and third intercooler portals, and the monolithic housing member and forming a continuous bounded air distribution plenum in a flow communication from the super charger portal through the super charger access portal and to each the second and third intercooler portal.

In another alternative and optional aspect of the proposed invention an induction assembly for a supercharged internal combustion engine further comprises: a super charger having a rotor assembly operative to produced a pressurized air through the super charger access portal, a first central intercooler assembly in the air distribution plenum receiving the pressurized air and passing a first cooled air to the air distribution plenum, the air distribution plenum splitting and passing the first cooled air to a second side intercooler assembly and an opposed third side intercooler assembly, and the second and the third side intercooler assemblies passing a second cooled air to opposed air inlet members external to the monolithic unitary housing member.

In another alternative and optional aspect of the proposed invention an induction assembly for a supercharged internal combustion engine further comprises: an operative water flow system in a parallel flow communication with each the first central intercooler assembly, the second side intercooler assembly, and the third side intercooler assembly, where the second side and third side interceder assemblies are paired.

In another alternative and optional aspect of the proposed invention, an induction assembly for a supercharged internal engine is provided wherein: the first central intercooler assembly is slidably removable from the bounded continuous plenum through the first central intercooler portal, whereby an assembly and maintenance burden of the induction assembly is improved.

In another alternative and optional aspect of the present invention, a method is provided for assembly of an induction system for a supercharged internal combustion engine comprising the steps of: providing a monolithic continuous unitary housing member, the monolithic housing member continuously bounding a bounded super charger rotor portal, a super charger access portal, a first central intercooler portal, and opposed second and third intercooler portals, the monolithic housing member and forming a continuous bounded air distribution plenum in a flow communication from the super charger portal through the super charger access portal and to each the second and third intercooler portal, providing a first central intercooler assembly in the first central intercooler portal, and providing a second and a third side intercooler assembly in the respective second and third intercooler portals.

The proposed assembly and system, while maximizing the surface area for convective cooling and inner plenum surface for air flow and housing, the monolithic unitary housing may be formed in related, but different functional shapes without departing from the scope and spirit of the present invention. For example, external air-flow fins may be added to the external housing surface to provide more laminar ambient air flow surface area during vehicle movement, and these air flow fins may be shaped in numerous ways, (parallel rows, series of irregular bumps, mixture of rows and ridges, etc.). For a second example, the monolithic unitary housing may be provided in differing widths and lengths to accommodate different engine block and intake arrangements or for use with different intercooler shapes. For a further example, the proposed monolithic unitary housing may be adapted to different cylinder arrangements (4-cylinder, 6-cylinder, 8-cylinder, 10-cylinder, 12-cylinder, etc.) all within the scope and spirit of the present invention. As a result, there is no single exclusive outer surface shape or profile to the present, rather there are numerous alternatives that will meet the same functional claims and goals as noted herein.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
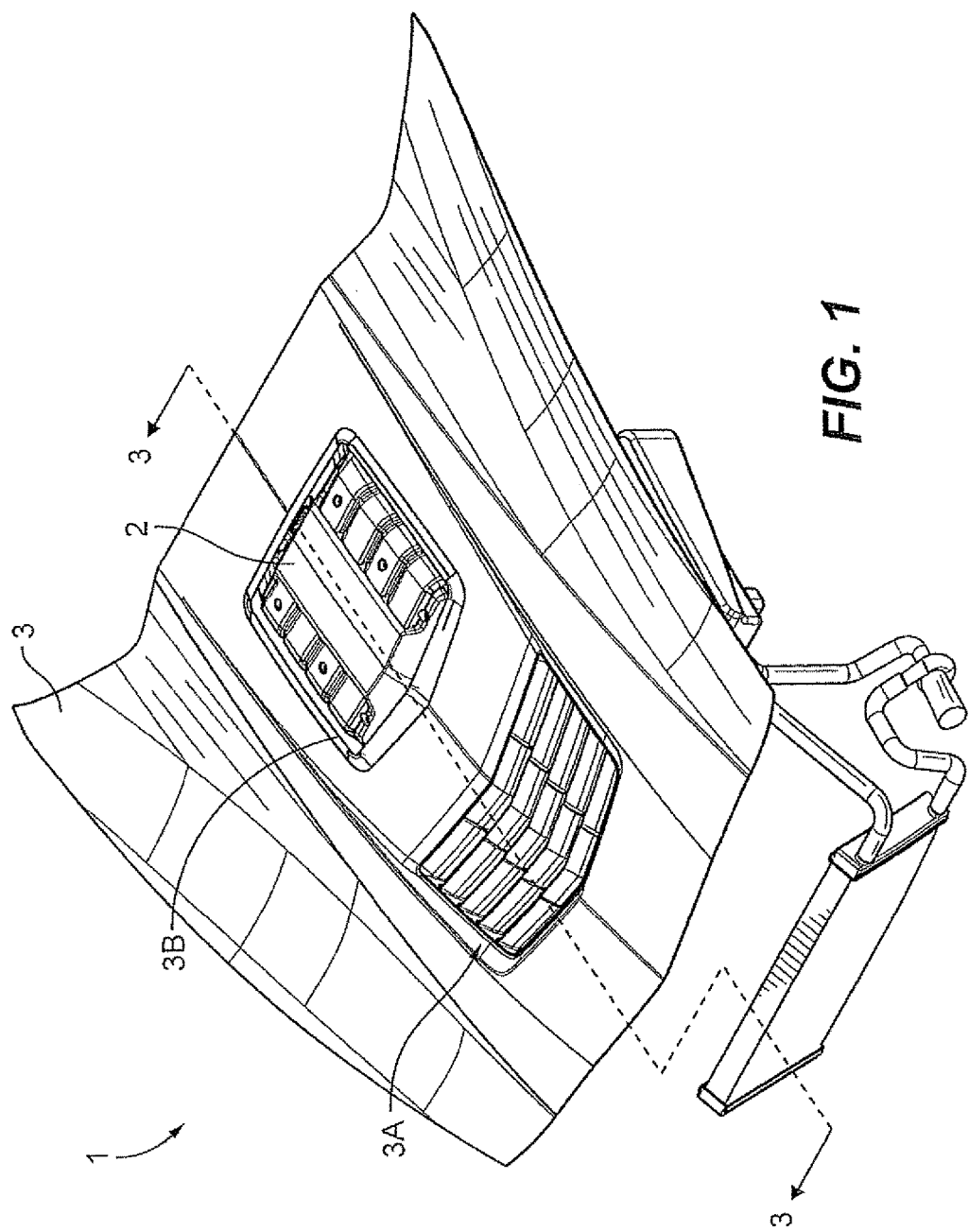
FIG. 1 is a perspective view of the proposed inventive housing positioned relative to a vehicle hood having an air cooling portal.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Referring now to FIGS. 1-10 the present invention involves an induction assembly and system 1 for a supercharged internal combustion engine having a v-type configuration (engine partially shown, but understood by those of skill in the art). As noted, a monolithic continuous unitary casting 2 housing a super charger assembly rotor assembly 6 (See FIG. 1) positioned relative to an automobile hood 3 (car not shown). The hood 3 includes a set of initial hood vents 3A (see FIG. 1) and a hood opening 3B bounding an upper portion of monolithic continuous unitary casting 2. Hood 3 operates relative to a fire wall structure 8 within an engine cavity of the vehicle and a particular improvement of the present invention is to enable an operative positioning of all components within the engine cavity while allowing for maintenance without comprehensive disassembly of the vehicle engine.

As will be noted from the figures, rotor assembly and super charger 11 includes a nose drive assembly 15 operative to receive a driving force from the internal combustion engine for operative rotation.

Figure 15:
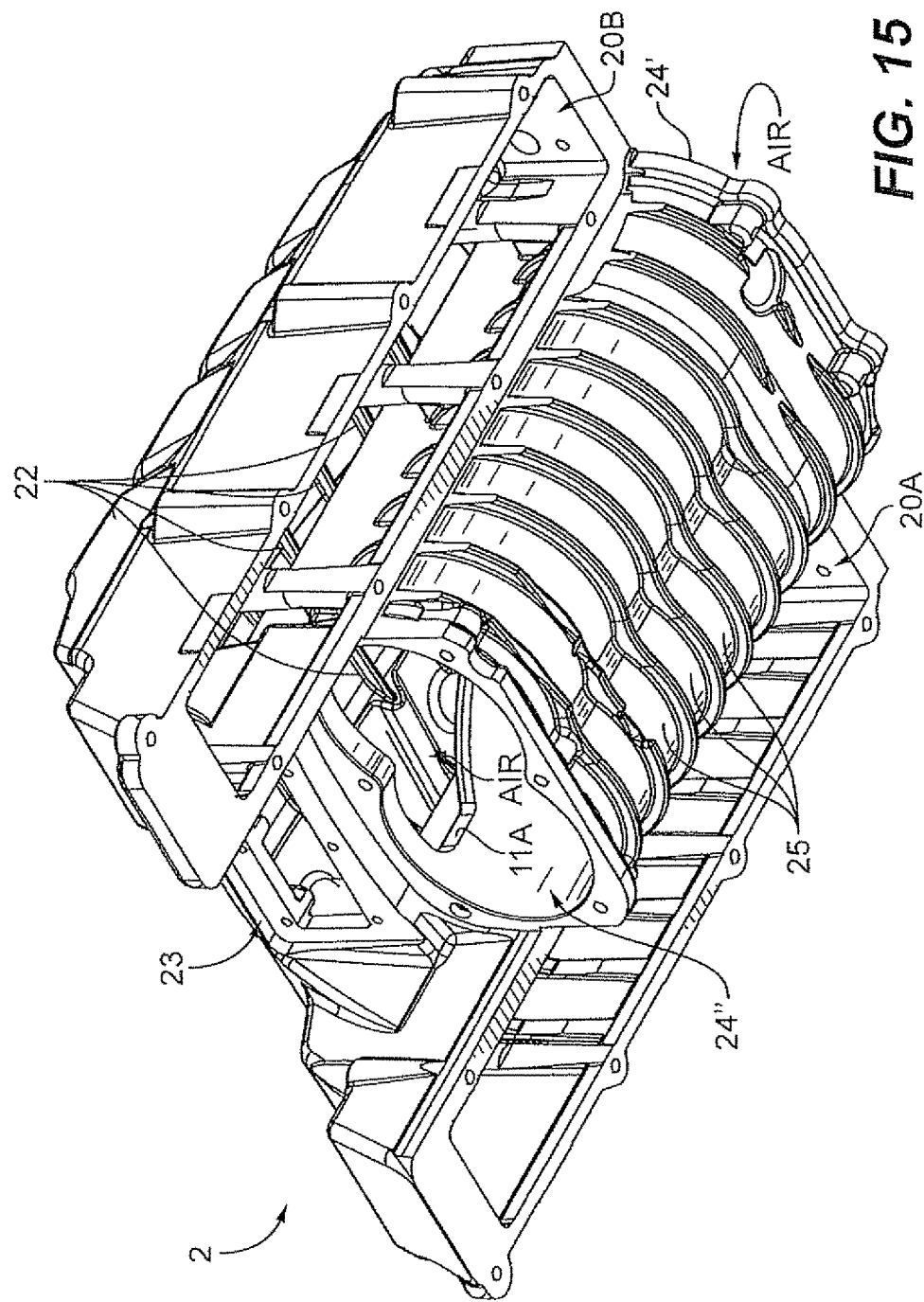
FIG. 15 is a bottom rear perspective view of FIG. 11 noting air flow access and the interior internal geometry of the monolithic casting with ribs assisting laminar flow.

During a use, an air intake 16 receives an air flow via hood vents 3A and ambient atmosphere and the intake air flow is pressurized forcefully through supercharger rotor assembly 11 within monolithic continuous unitary casting 2, and is transmitted through an access portal 11A (See FIGS. 15-17) as will be discussed herein.

Monolithic unitary casting 2 includes a left side 20A and a right side 20b intercooler portal for receiving respective ones of a pair of side intercooler assemblies 13, 13 before joining to respective side air intake runners 12, 12 for transferring cooled pressurized air to the cylinder heads of the internal combustion engine. Casting 2 includes a central intercooler portal 20C (FIG. 10) and a continuously bound plenum including left and right intercooler portals 20A, 20B as well as a central intercooler portal 23 on a rear side thereof shaped to slidably-receive a central intercooler 14 from the rear side (see FIG. 5). A super charger portal 24" is part of the monolithic construction and is shaped to slidingly-receive the super charger rotor assembly 11, as shown, from a rear side, and a super charger air intake portal 24' is shaped on a front side of the monolithic housing 2. It will be understood that the super charger rotor assembly includes a nose drive assembly 15 for receiving a driving force for operation, and a rear cover door 15A.

During an operation a water flow operates in parallel to the central intercooler assembly 14 and to each respective side intercooler assembly 13, 13. Water flows from a heat exchanger 6 operative to exchange heat with an ambient air, through a water pump assembly 4, and a reservoir system 5 via a plurality of outgoing and return tubing 7 (shown respectively) to each respective intercooler assembly 13, 13, 14. At a front portion of the monolithic casting 2, a water cross over manifold 10 receives and transmits cooling water in parallel from either side intercooler assembly 13, 13 and links with a water manifold assembly 9 for regulating an in/out flow of cooling water between each intercooler assembly 13, 13, 14 and the other respective elements in the water flow system 30. As is shown particularly in FIGS. 1, 3, 4, and 5 tubing elements 7 for the central intercooler assembly 14 are shown for convenience. It will be understood by those of skill in the art of automotive engineering, after study of the present disclosure that the flow elements of water flow system 30 may be modified and positioned differently and remain within the scope and spirit of the present invention. The present arrangement shown provides an improved convenience but is not limited thereto. For example, additional pumps, different reservoirs, and different pumps, cross-over manifolds and other separate manifolds may be used without departing from the present invention.

The interior surface of monolithic continuous unitary casting 2 includes a central rib member 21 (see FIGS. 10, 16 for example) to aid in directionally bifurcating the laminar pressurized air flow exiting intercooler 14. A plurality of lateral rib members 22 project generally perpendicularly away from central rib member 21 along the inside surface of casting 2 to further aid and generate laminar airflow to respective side intercooler assemblies 13, 13. It will be understood that internal ribs 21, 22 guide efficient pressurized laminar air flow, manage sound attenuation to reduce noise, and aid stiffening of casting 2.

Figure 12:
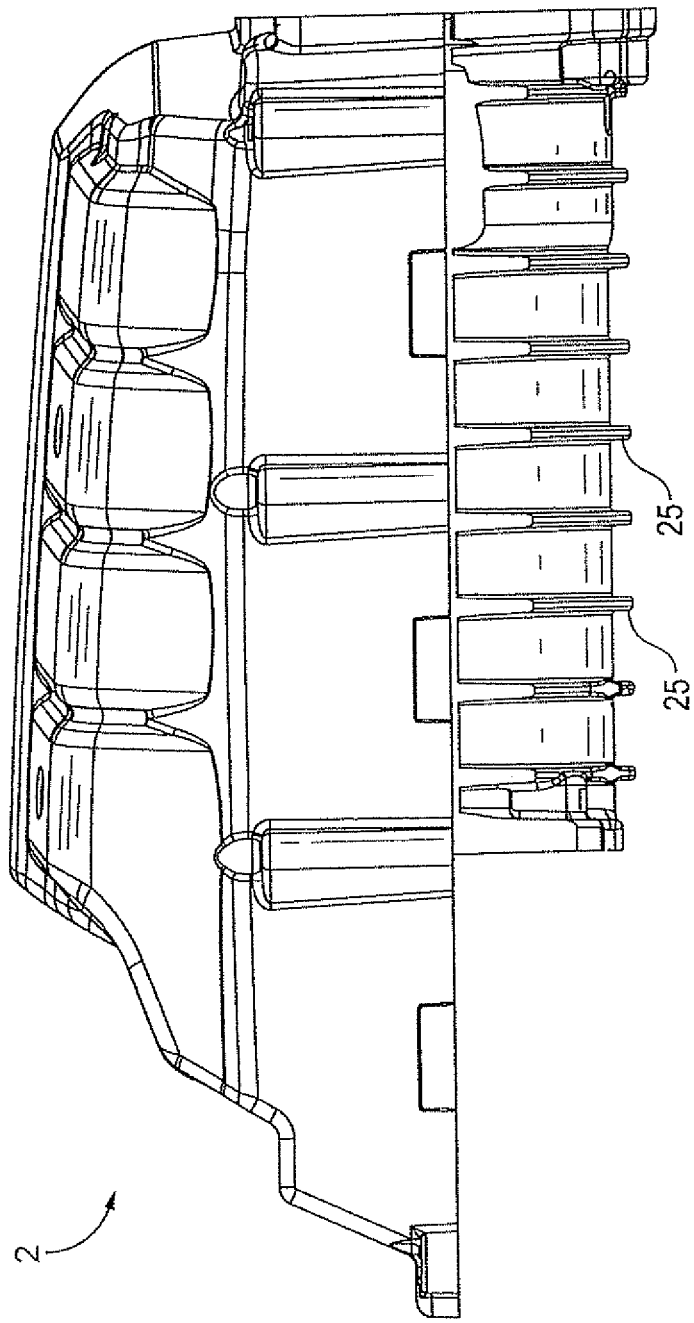
FIG. 12 is a side elevation view of FIG. 11 noting the arrangement of strengthening ribs.
Figure 13:
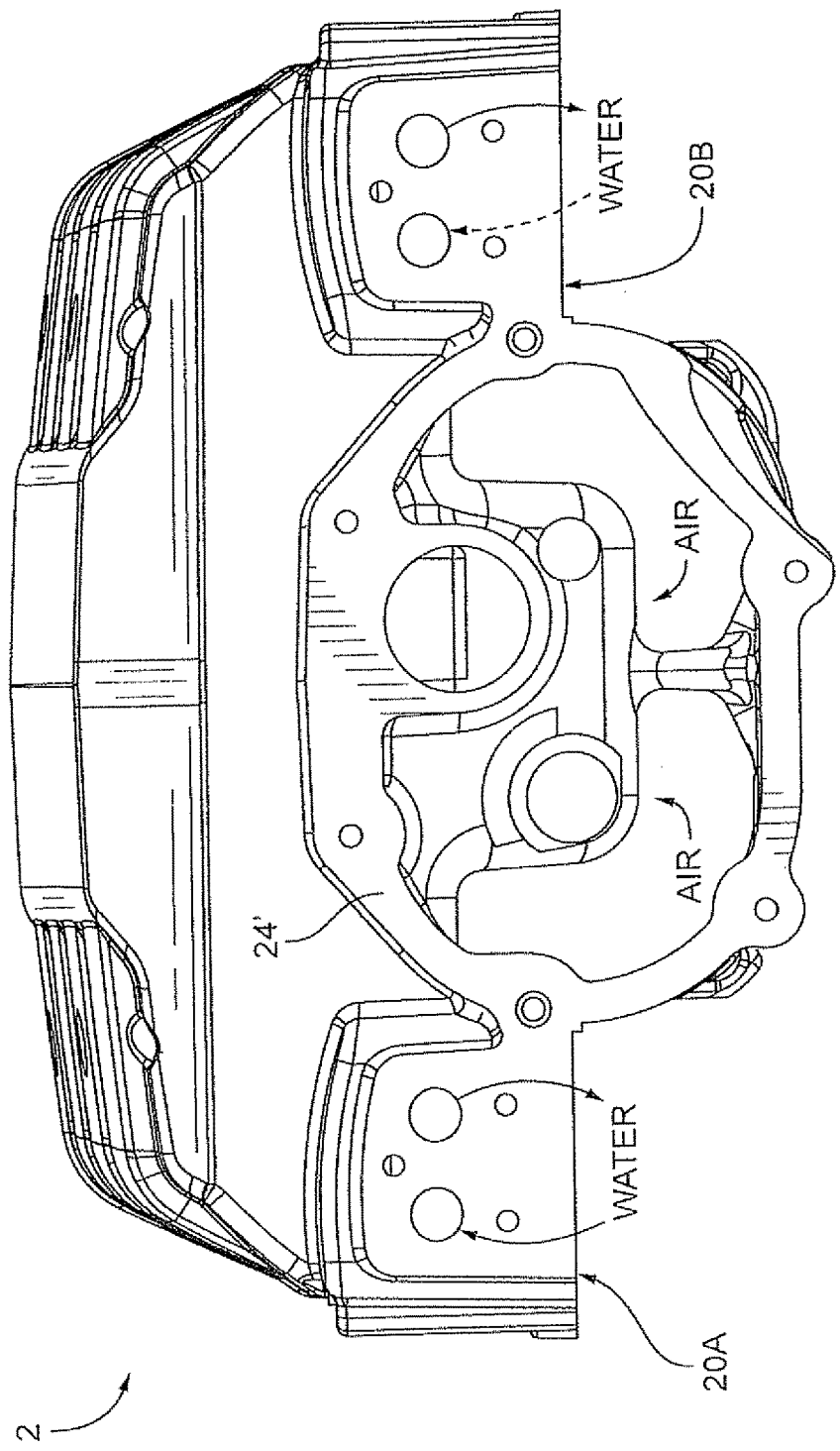
FIG. 13 is a front elevation view of FIG. 11 of the monolithic continuous unitary casting.
Figure 14:
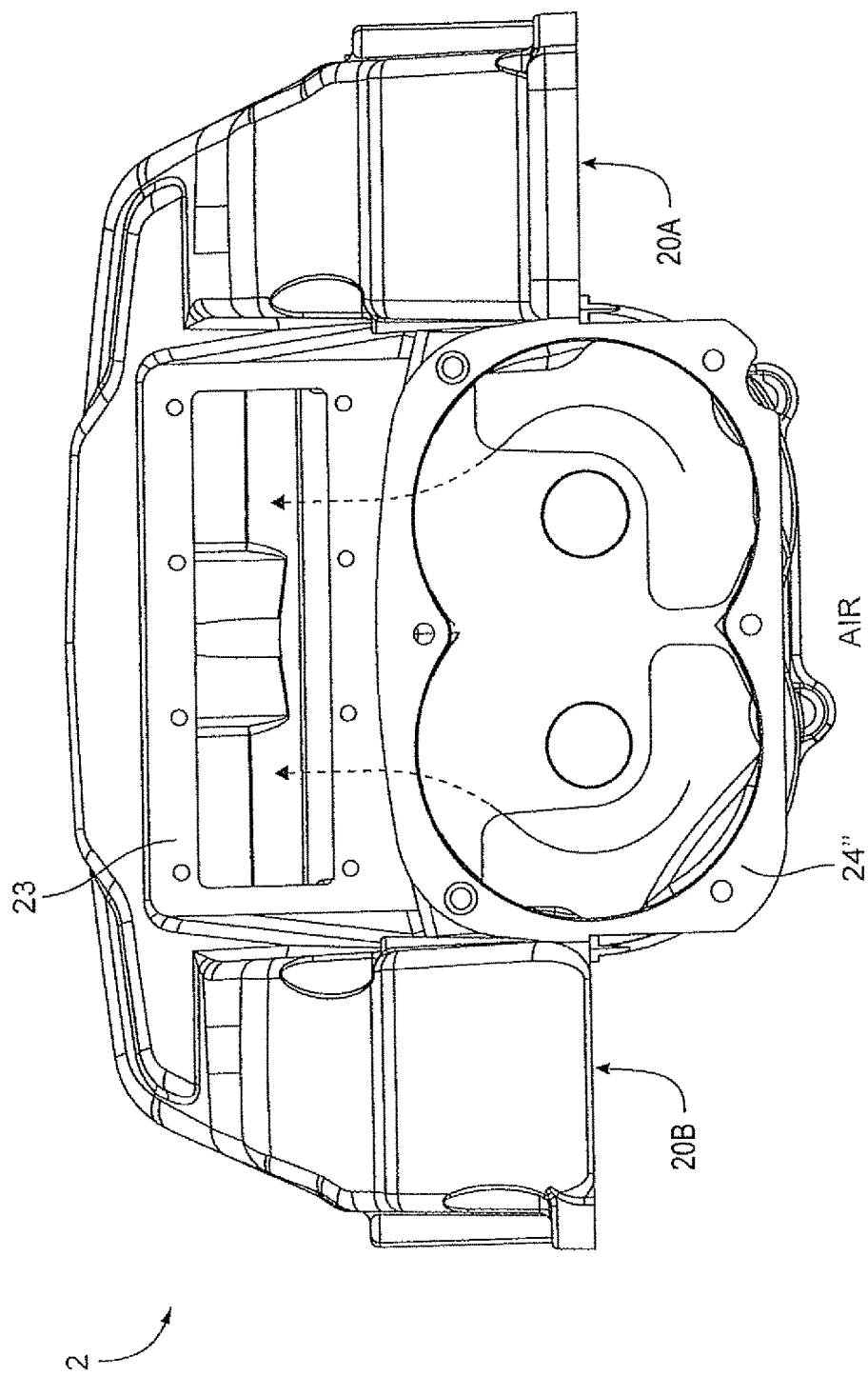
FIG. 14 is a rear elevation view of FIG. 11 of the monolithic continuous unitary casting noting the easy access to the intercooler and supercharger features.
Figure 16:
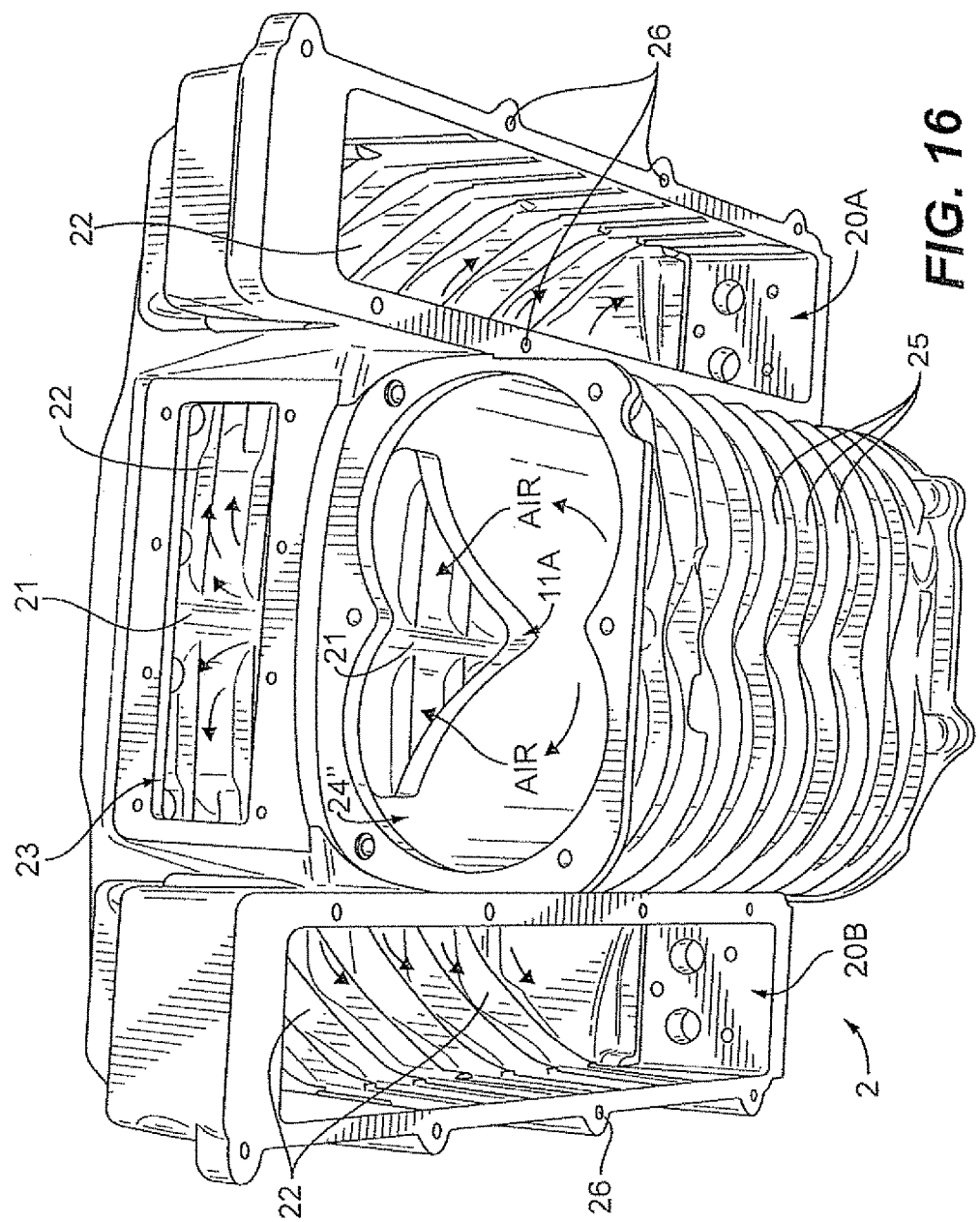
FIG. 16 is a bottom rear perspective view of FIG. 15 of the monolithic continuous unitary casting further noting the laminar air flow for cooling and operation.
Figure 17:
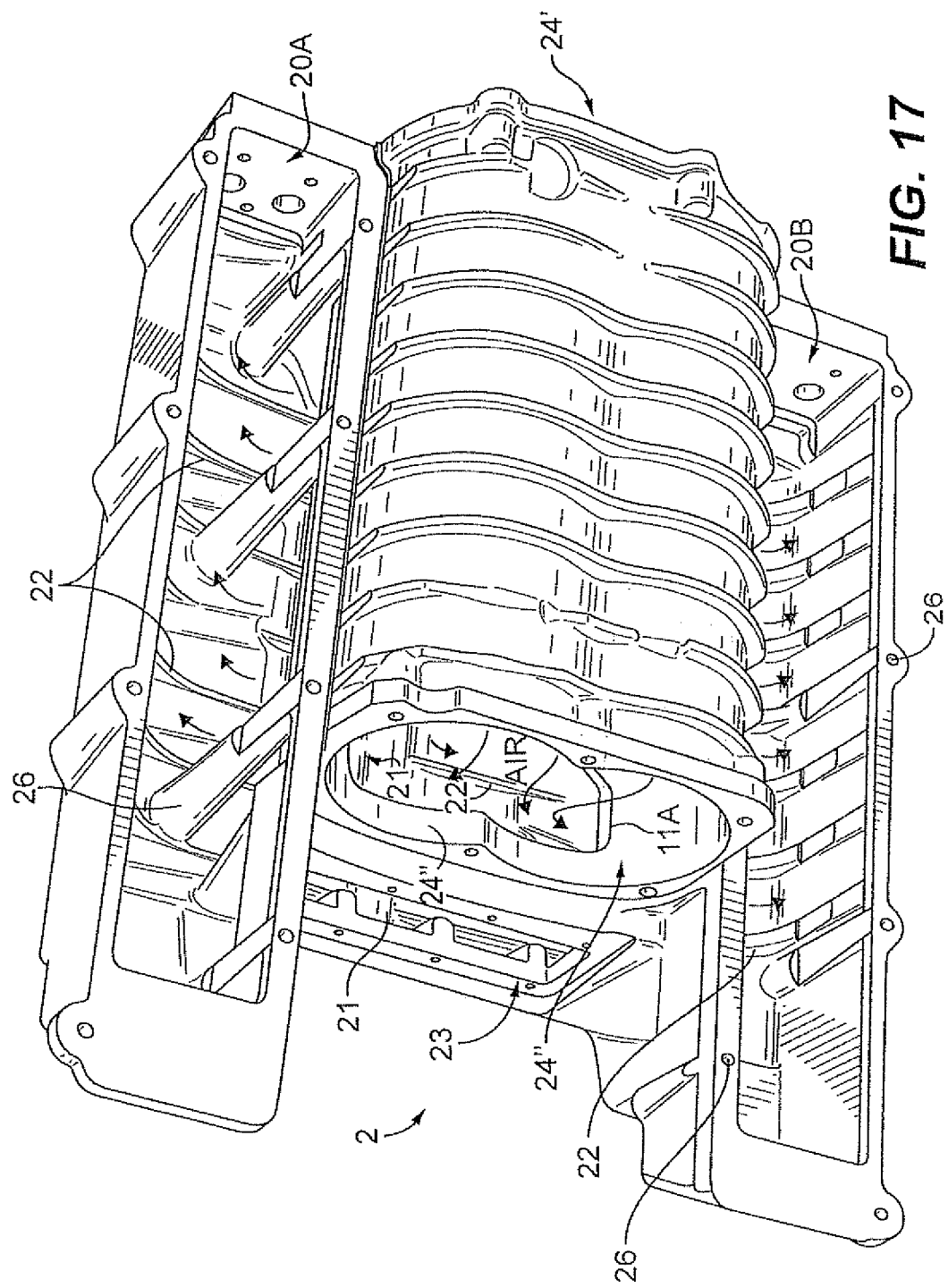
FIG. 17 is a side rear perspective view of FIG. 16 noting the interior geometry for air flow as unrestricted.
Figure 18:
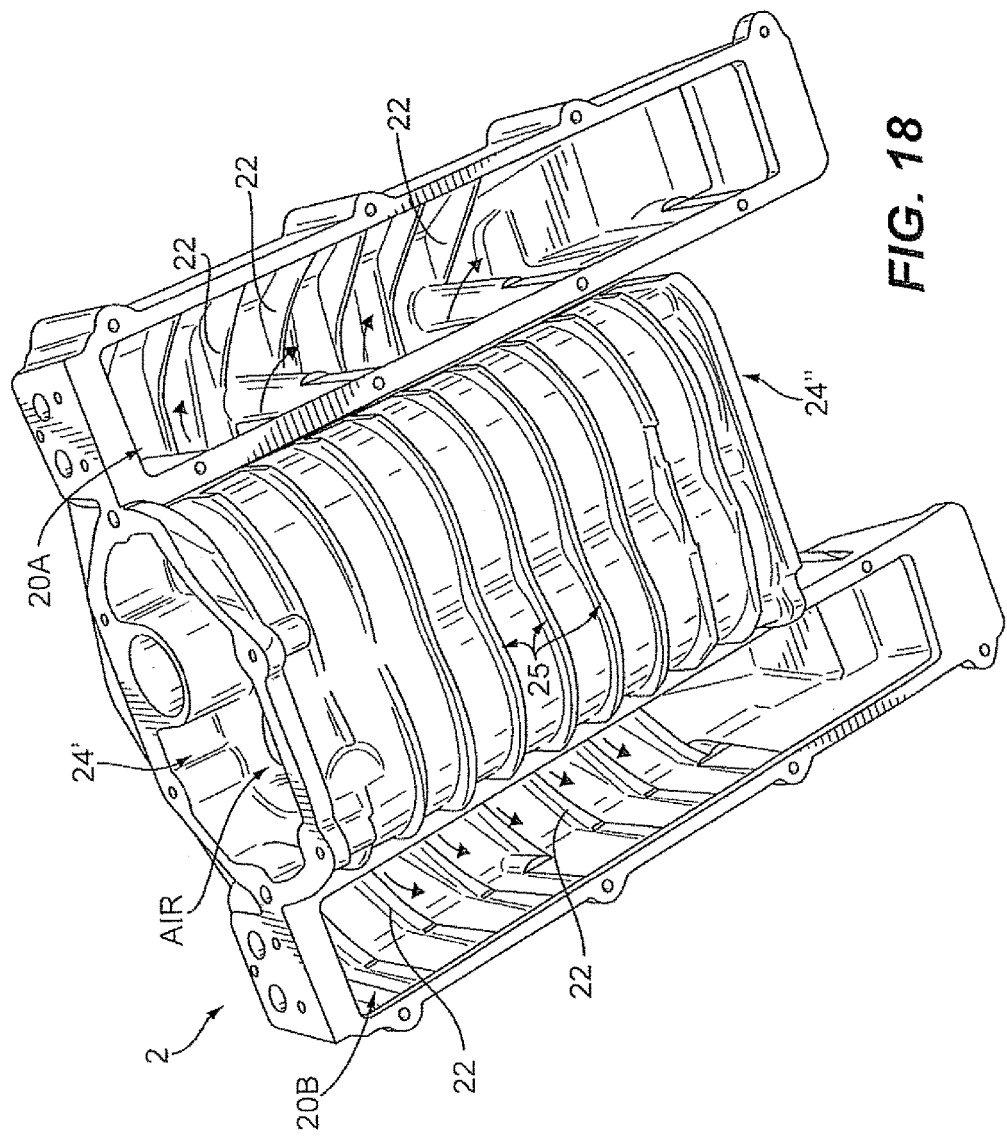
FIG. 18 is a front perspective bottom view of FIG. 17 noting the interior geometry of air flow as unrestricted.
Figure 19:
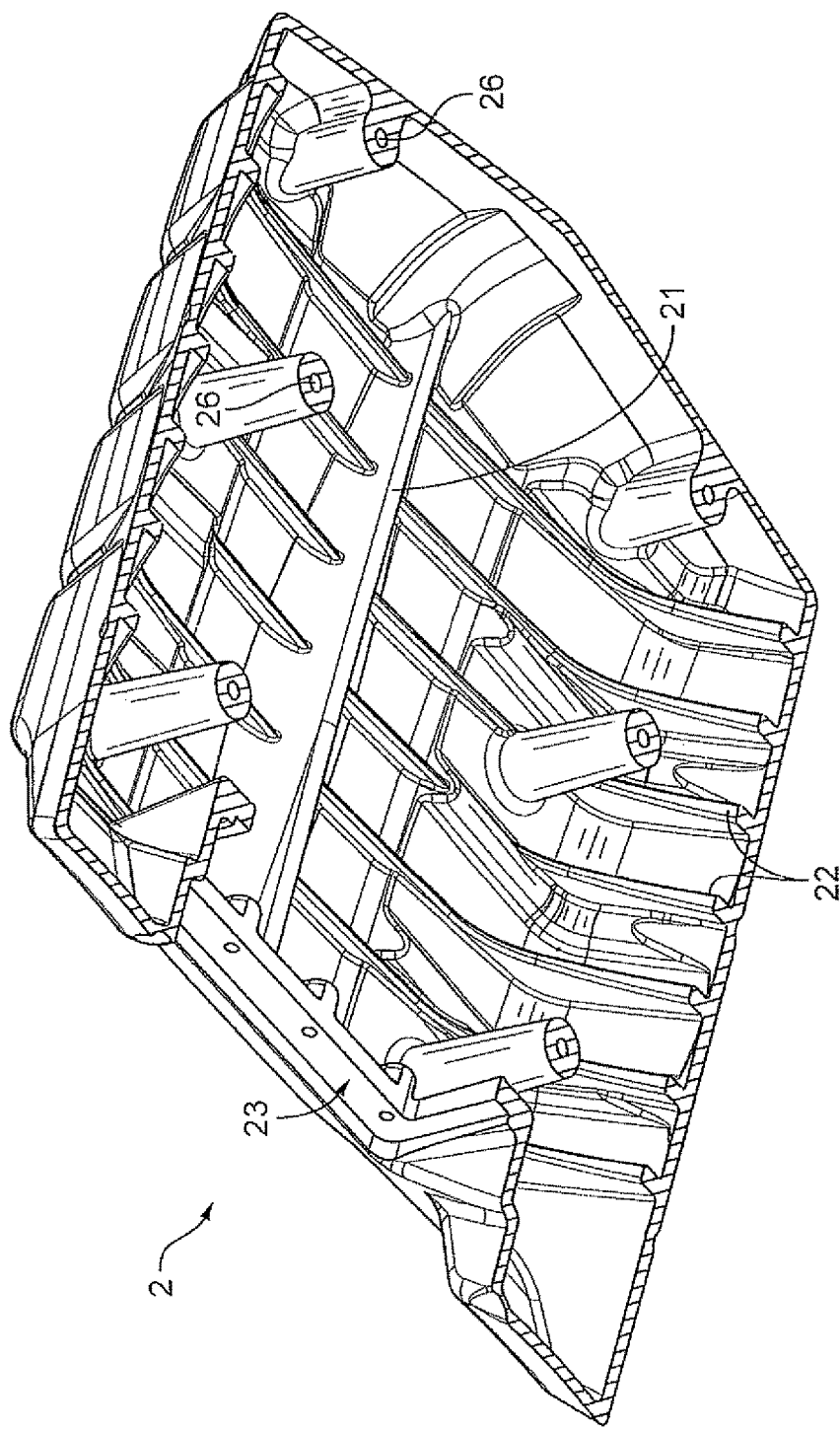
FIG. 19 is a bottom perspective view along section line 19-19 in FIG. 2 noting the interior ribbing and air flow structure for illustrating the continuous air flow to the side intercooler receivers from the plenum and the internal surface profile thereof.
Figure 20:
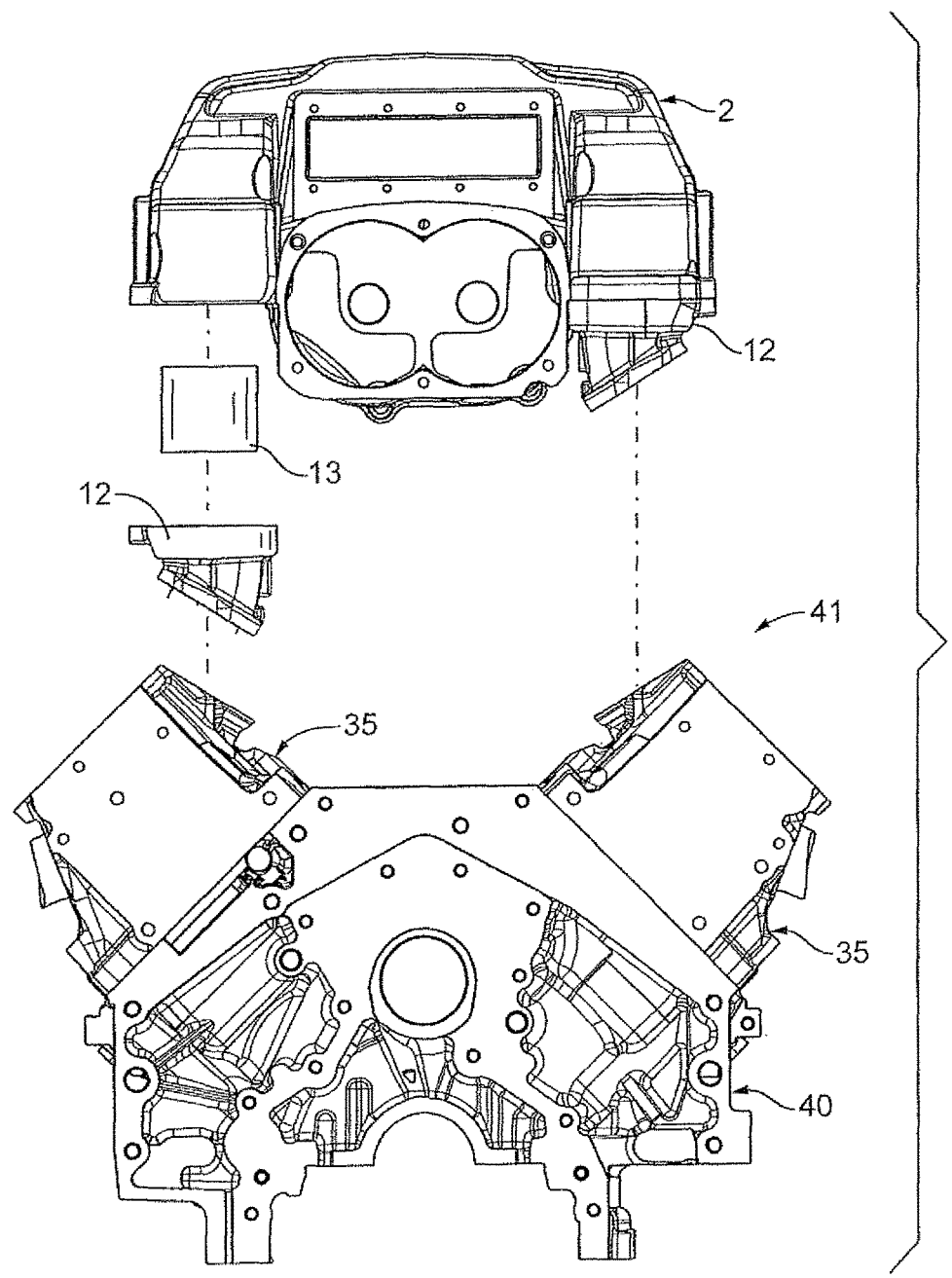
FIG. 20 is a rear elevation exploded view of the monolithic continuous unitary casting and assembly as in FIG. 2 noting the central intercooler portal and rear access to the super charger portal.

At a bottom location of monolithic continuous unitary casting 2, below super charger rotor assembly 11 and super charger portals 24', 24" are provide a plurality of rotor support ribs 25 projecting outwardly therefrom (see FIGS. 12, 16, and 18). Ribs 25 provide an additional rigidity and thermal conduction to casting 2 while enabling a thin wall section in the casting for a substantial weight reduction.

Referring additionally to FIGS. 11-22 additional sectional views are provided to aid in comprehension of induction assembly and system 1, monolithic continuous induction housing 2, and the related positions of central intercooler 14 and side intercoolers 13, 13 relative to runners 12, 12.

As will well understood from the cross-sectional arrangements in FIGS. 8, 9, 10, 15, and 19, the induction housing 2 is continuous as a monolithic member having a thin wall thickness. In this matter, induction housing 2 can advantageously be assembled and removed from a set of cylinder heads 35, 35 and a respective cylinder block 40 provided for illustrative purposes and to illustrate an overall block assembly 41 containing these basic components. As a result, it will be recognized by those of skill in the art that induction assembly and system 1 may be readily incorporated with cylinder heads 35, 35 and cylinder block 40 and overall block assembly 41 having various geometries, within the scope and spirit of the present invention.

Figure 2:
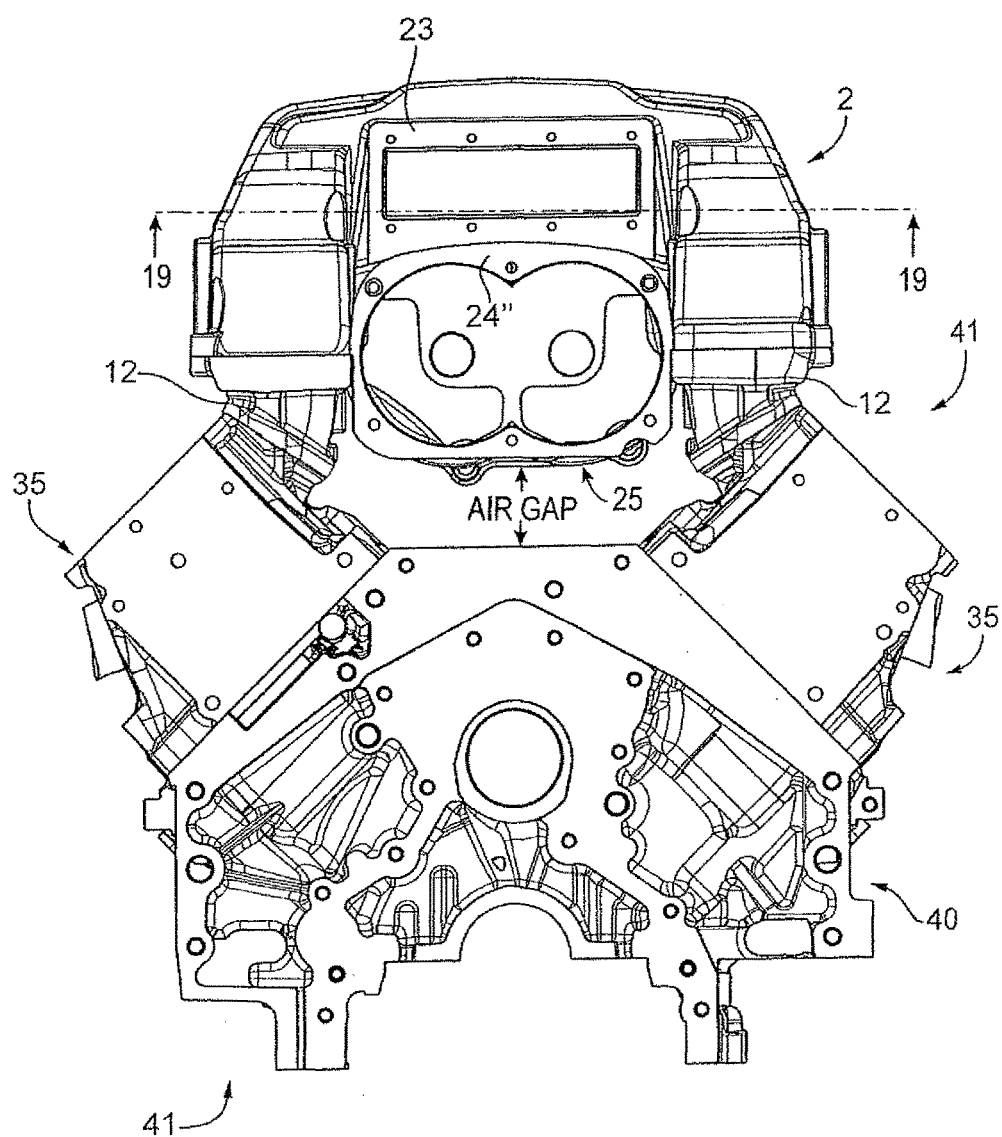
FIG. 2 is a rear elevation view of a monolithic block assembly and a portion of an engine, and cylinder head, and intake runners noting a rear access portal to the intercooler and supercharger arrangement.
Figure 3:
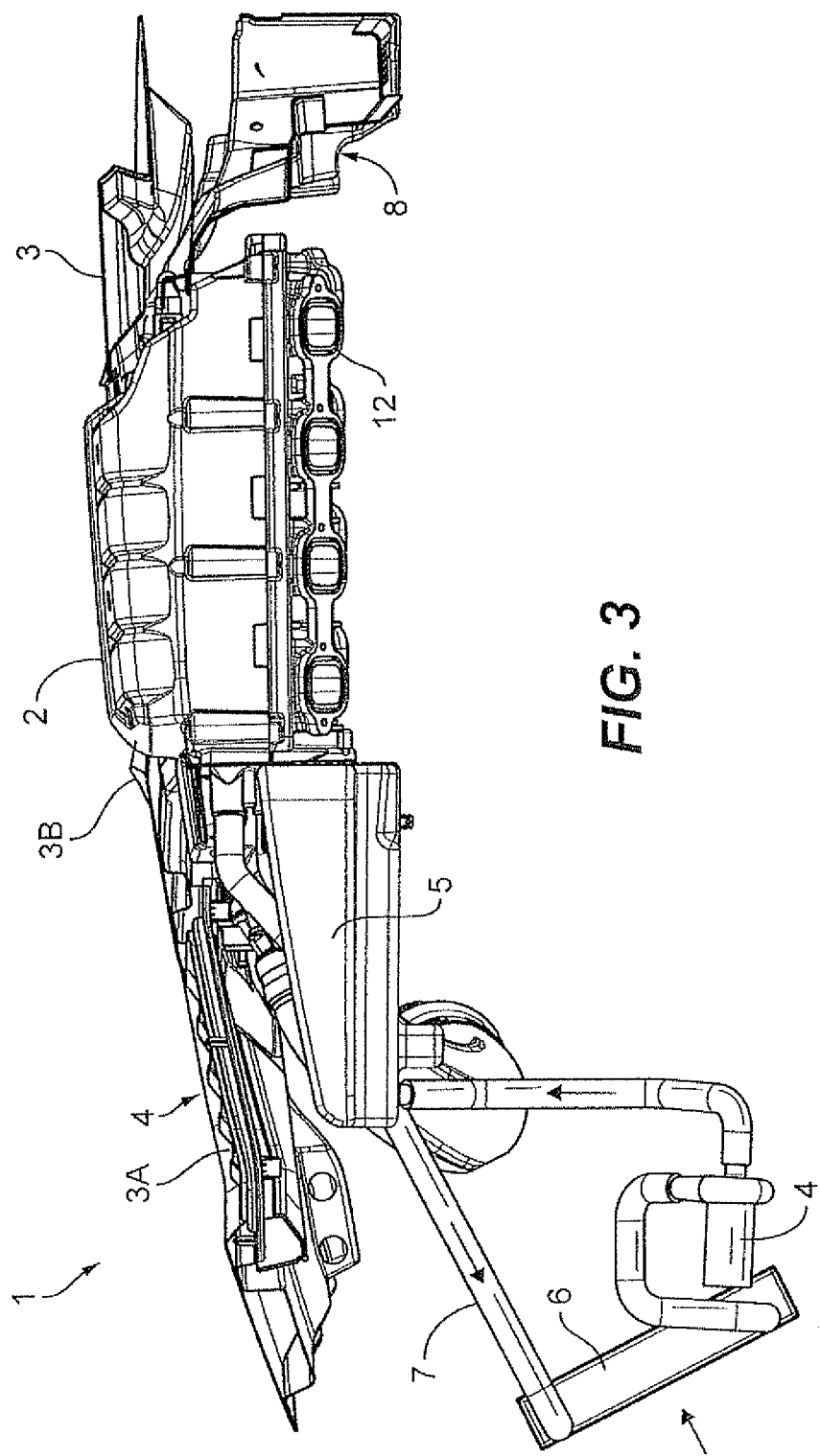
FIG. 3 is a side elevation view taken along section line 3-3 in FIG. 1, noting the relative positions of the vehicle hood, fire wall structure, and the monolithic continuous unitary casting.
Figure 4:
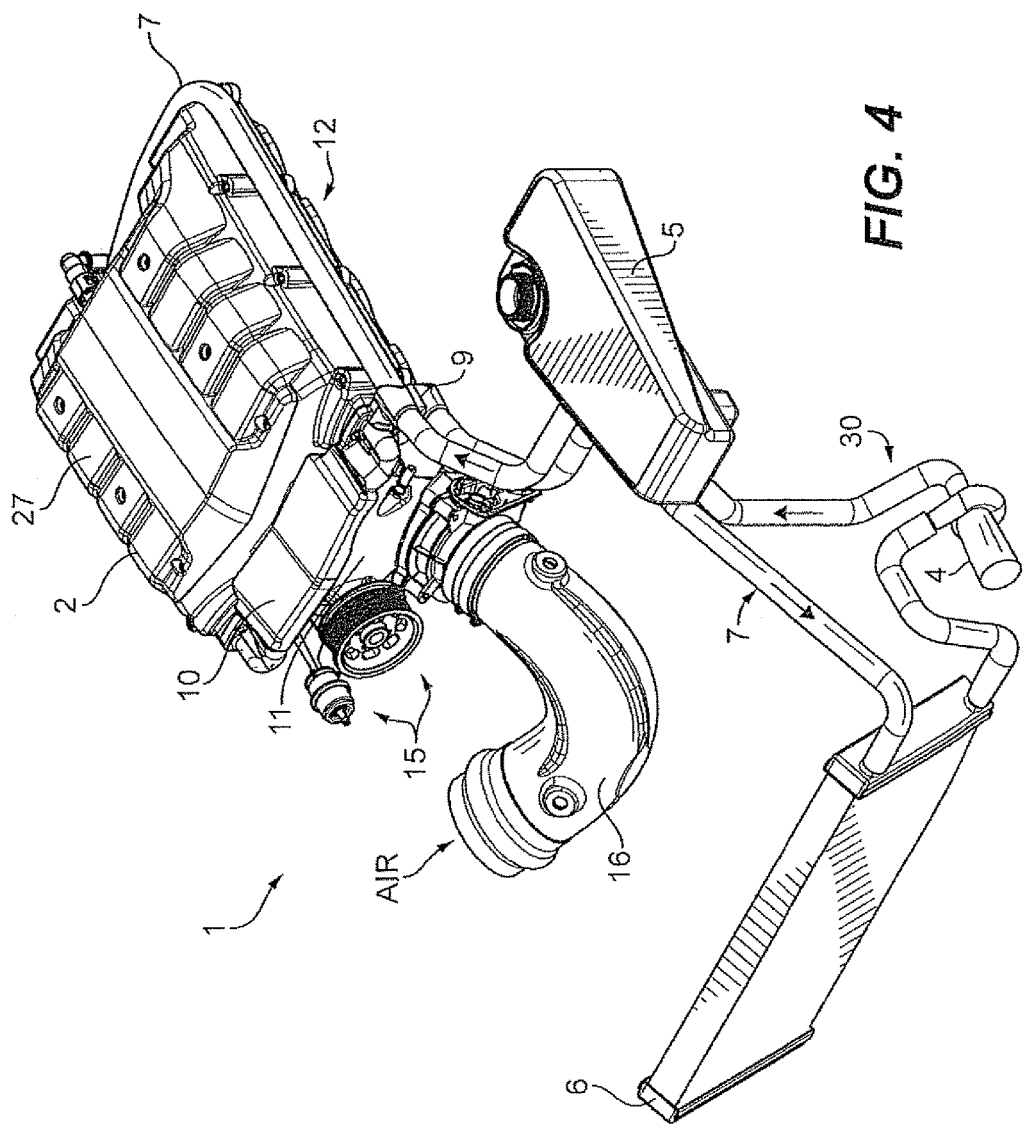
FIG. 4 is a perspective top front view of a monolithic continuous unitary casting housing a supercharger with a rotor and gear assembly operative to discharge pressurized air to a common bounding receiving plenum mounted with related components.
Figure 21:
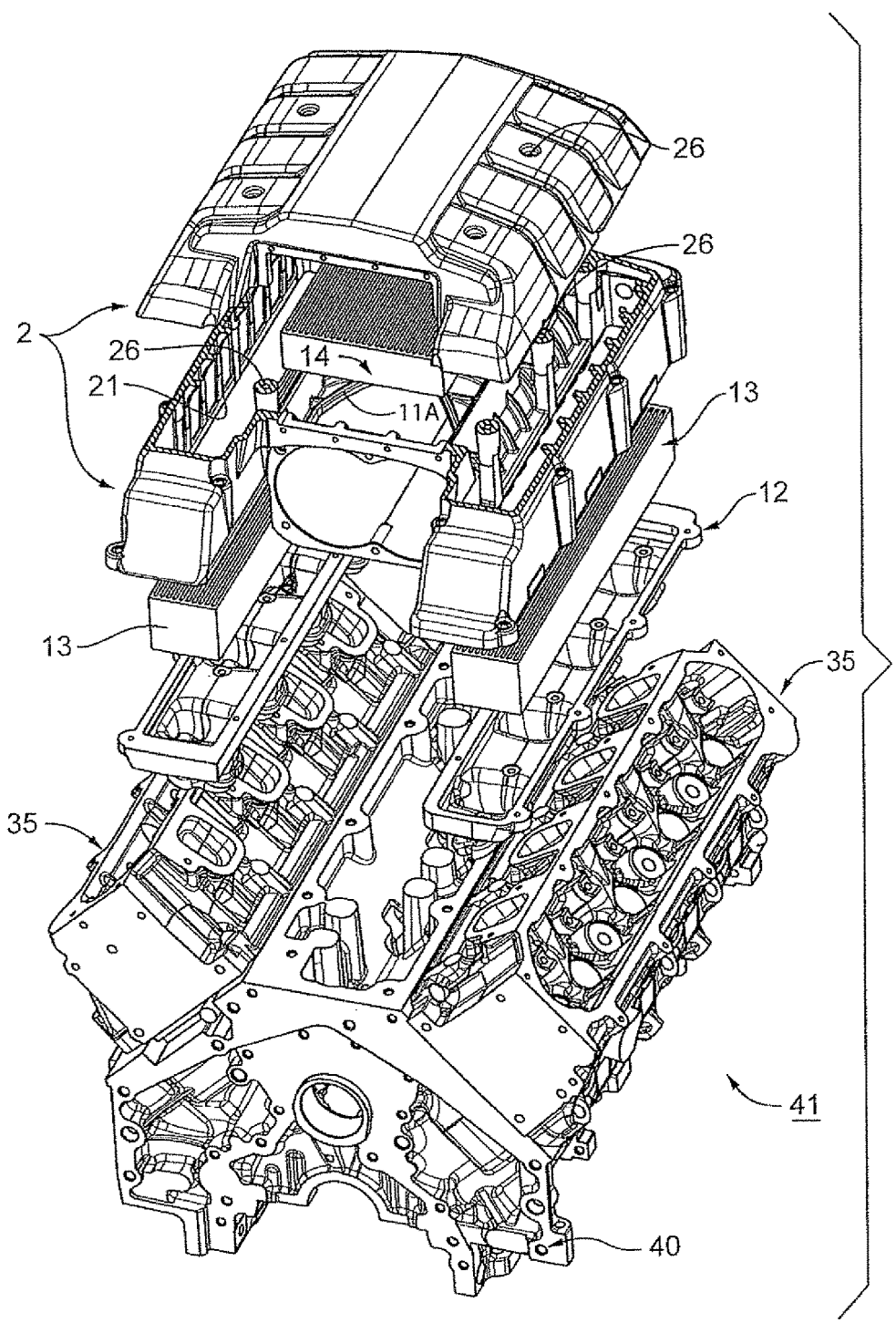
FIG. 21 is a top rear perspective exploded and partial sectional view of FIG. 20 noting the positioning and arrangement of intercoolers.
Figure 22:
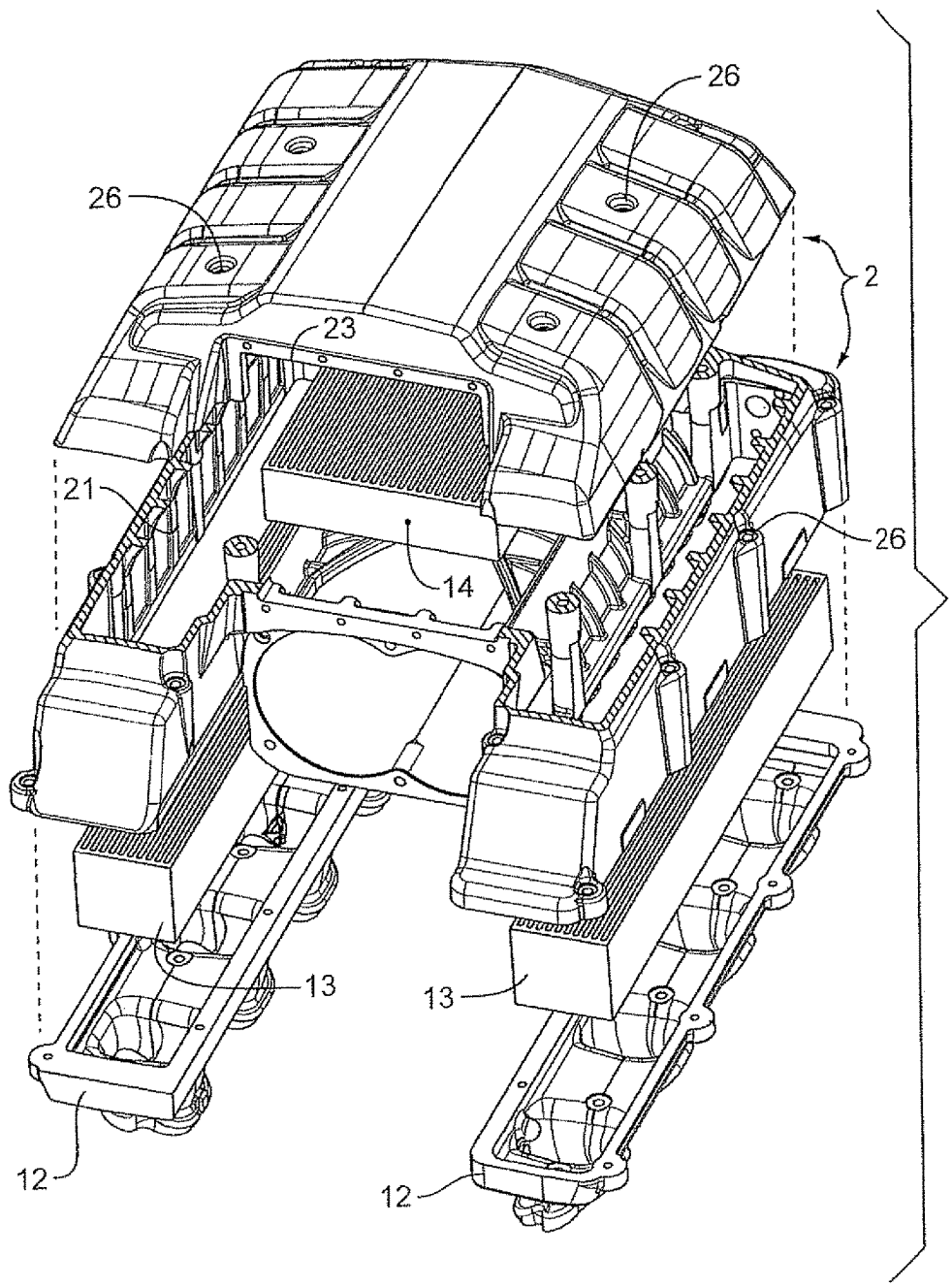
FIG. 22 is a rear top perspective exploded and partial sectional view as in FIG. 21 noting the ease of accessibility and maintenance and improved air flow.

As will be understood from considering side elevation view of block assembly 41 in FIGS. 2, 21, there is enabled by the present invention, an air gap (shown) between the bottom super charger ribs 25 and the central portion of cylinder block 40, allowing for additional cooling, as well as other advantages in terms of efficiency and engine-component-arrangement.

It will be understood that monolithic continuous unitary casting 2 may be alternatively called a monolithic housing 2, for convenience without departing from the scope and spirit of the present invention.

It will be noted that side intercooler assemblies 13, 13 are provided within left and right intercooler portals 20A, 20B (see FIGS. 14, 15, 16), and are positioned within monolithic housing 2 allowing for easy access upon simple removal of monolithic housing 2 for maintenance. As will be noted, monolithic housing 2 contains a series of bolt holes (16 in total shown) respectively identified as openings 26. As will be appreciated from study of the figures, bolt holes 26 are continuous through monolithic housing 2 and extend through either side walls of the respective outer sides of monolithic housing 2 or are fully enclosed passages through the interior sides of the continuous bounded plenum within housing 2 (see for example, FIGS. 10, 16, 17, 18, where it can be seen that laminar air flows pass from central rib 21 region along lateral rib regions 22 directly to side intercooler assemblies 13, 13 and directly therethrough. It is noted that with the full enclosure of bolt holes 26 that tightening during assembly cannot distort unitary casting 2 because any bolt is continuously supported by the bolt-hole-side-wall (See FIG. 9)

Figure 5:
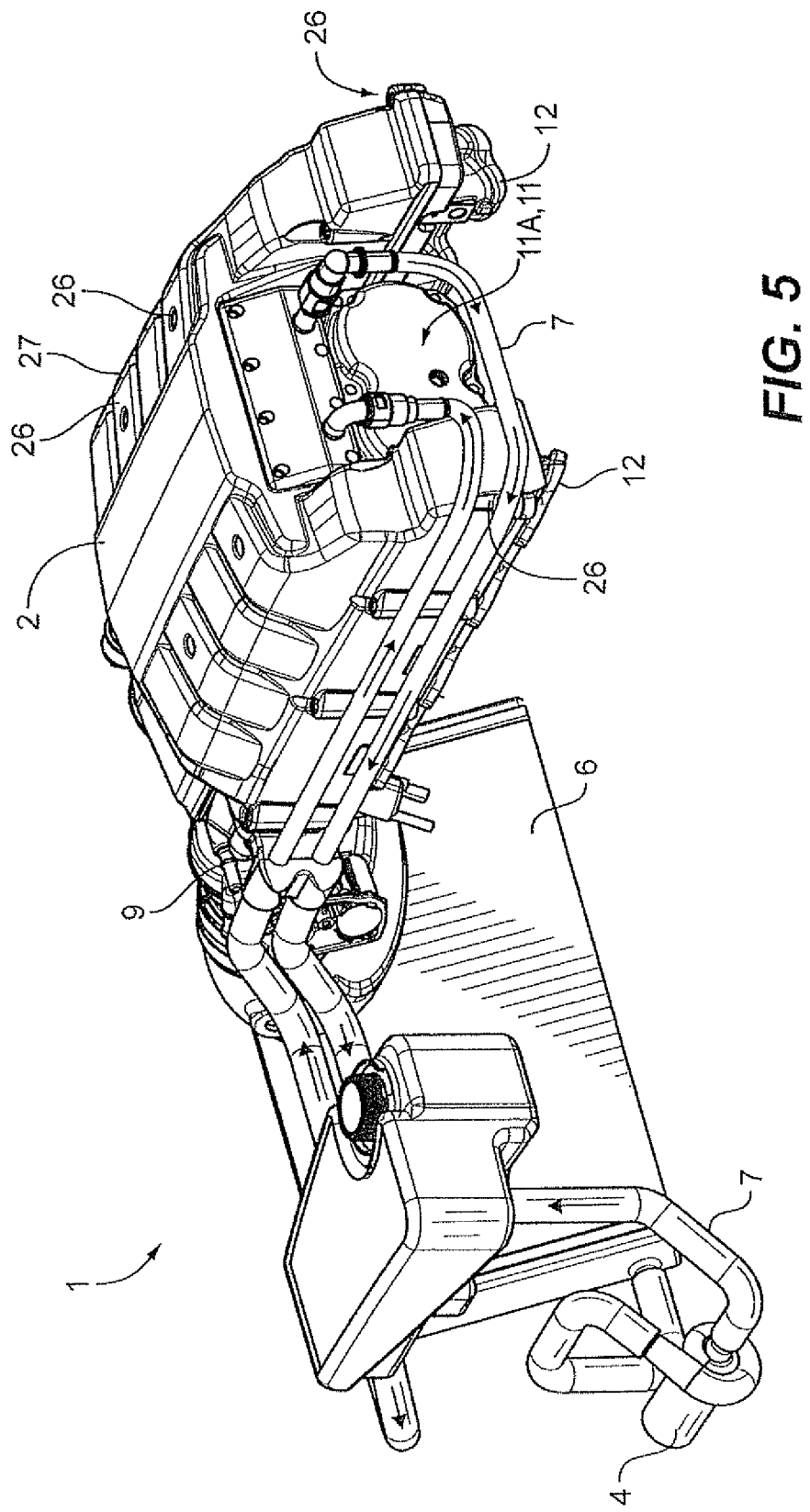
FIG. 5 is a perspective top rear view of a monolithic continuous unitary casting housing a supercharger as shown in FIG. 4.
Figure 6:
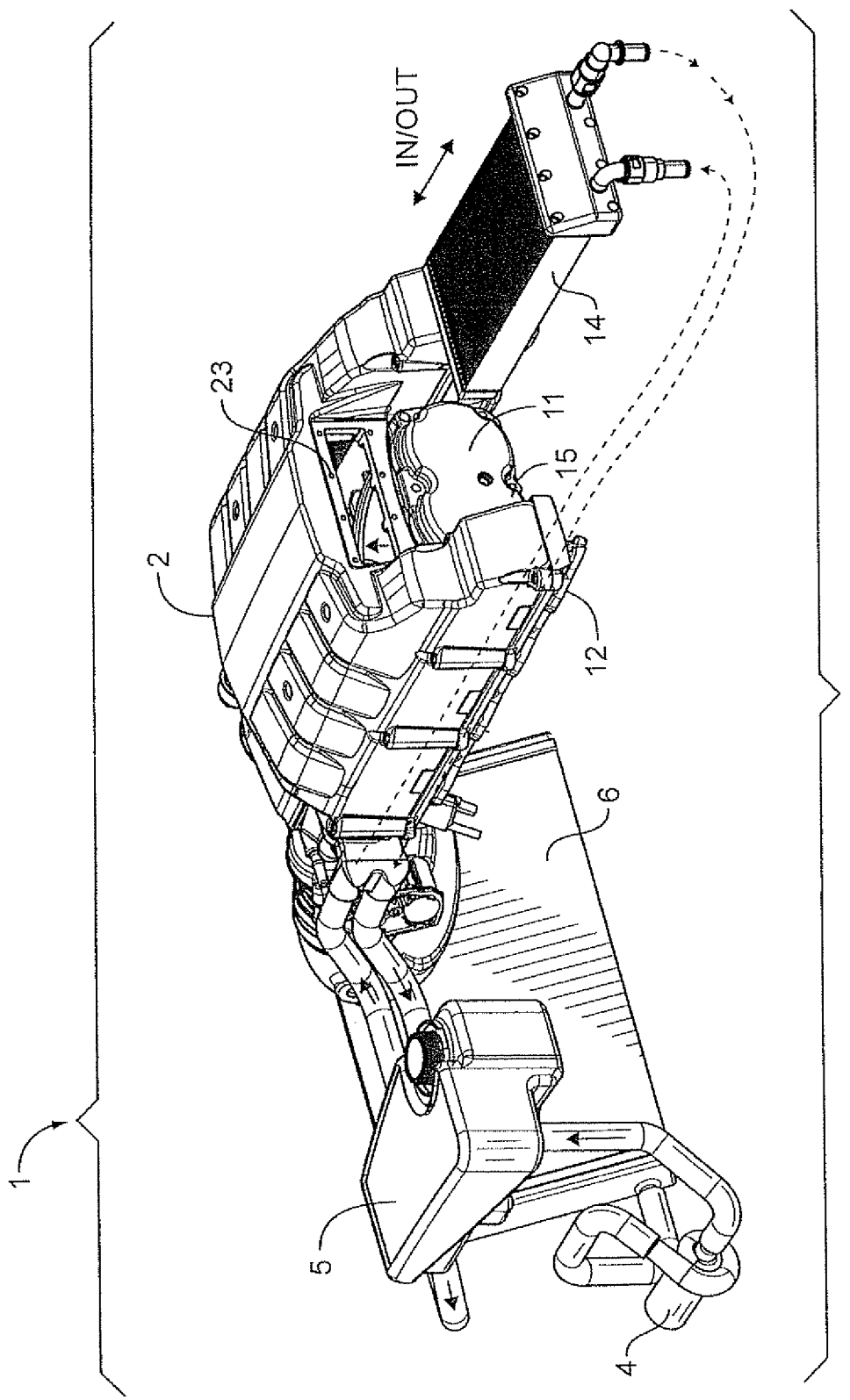
FIG. 6 is a partially exploded top rear view of FIG. 5 noting removal of the central intercooler.
Figure 7:
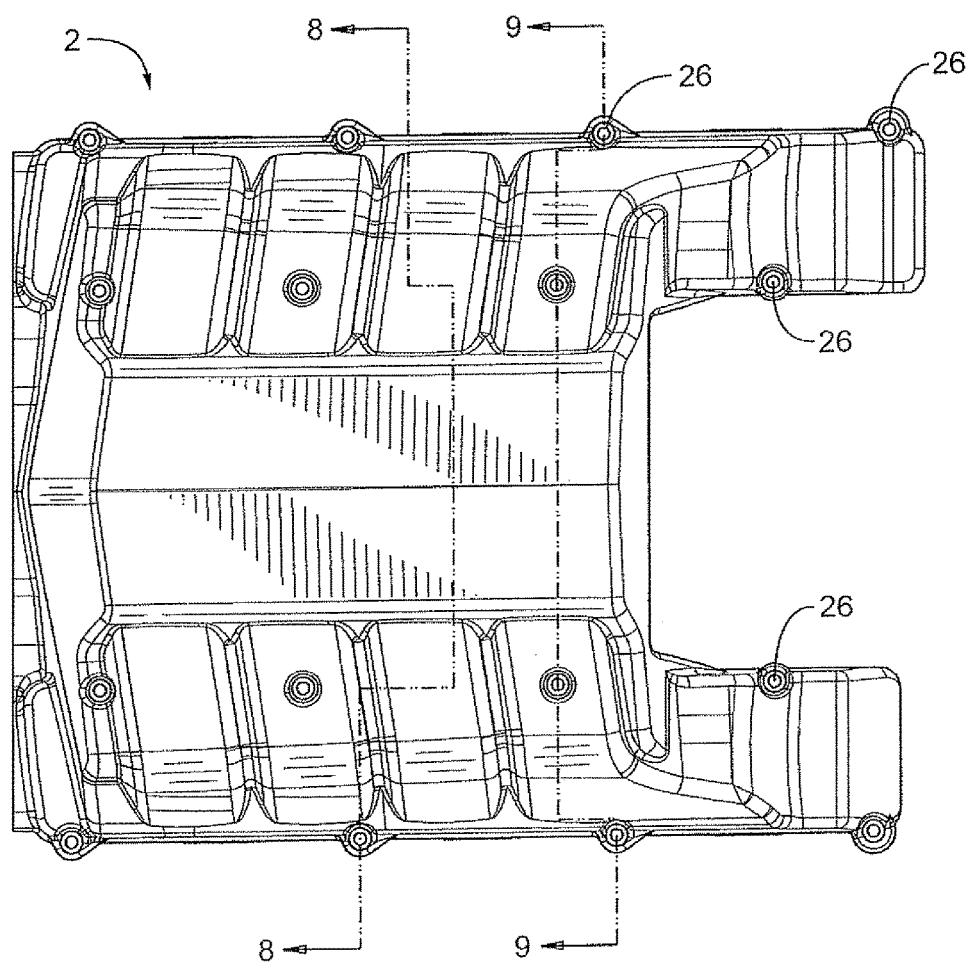
FIG. 7 is top plan view of the monolithic continuous unitary casting housing a supercharger.
Figure 8:
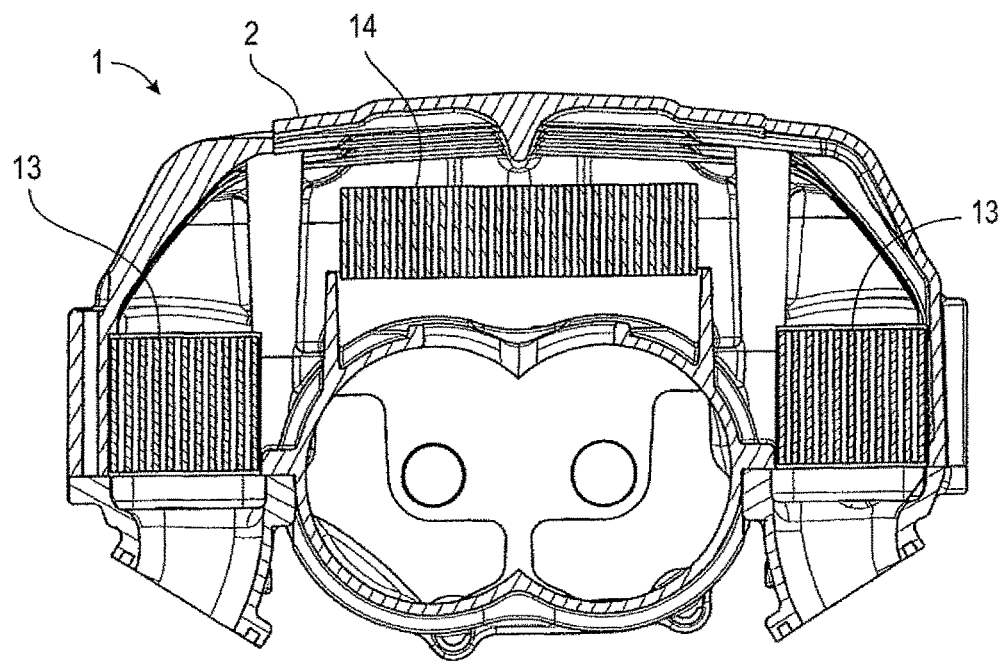
FIG. 8 is a partial sectional view along section line 8-8 in FIG. 7.
Figure 9:
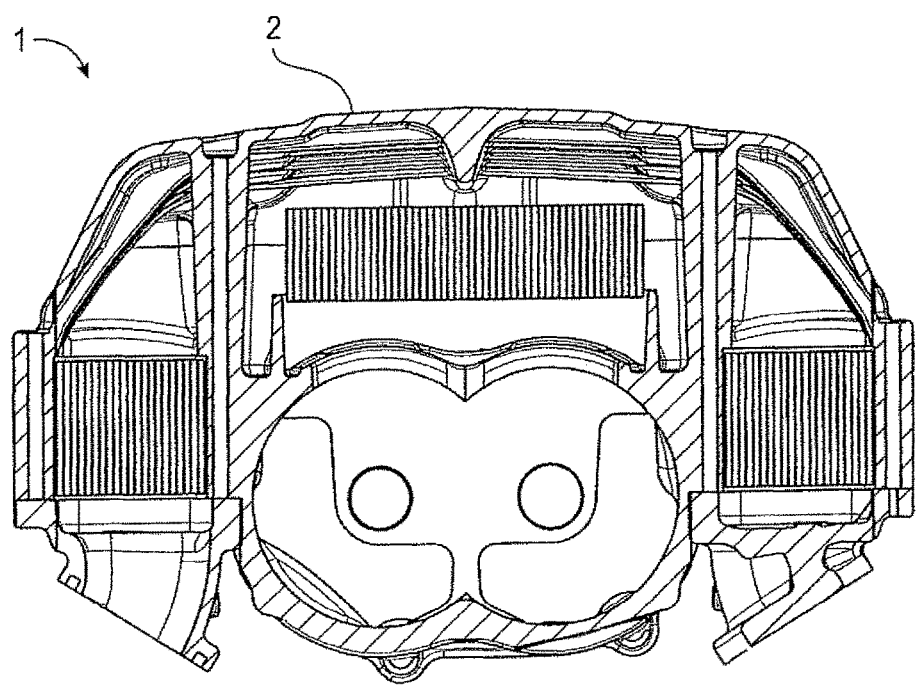
FIG. 9 is a partial sectional view along section line 9-9 in FIG. 7.
Figure 10:
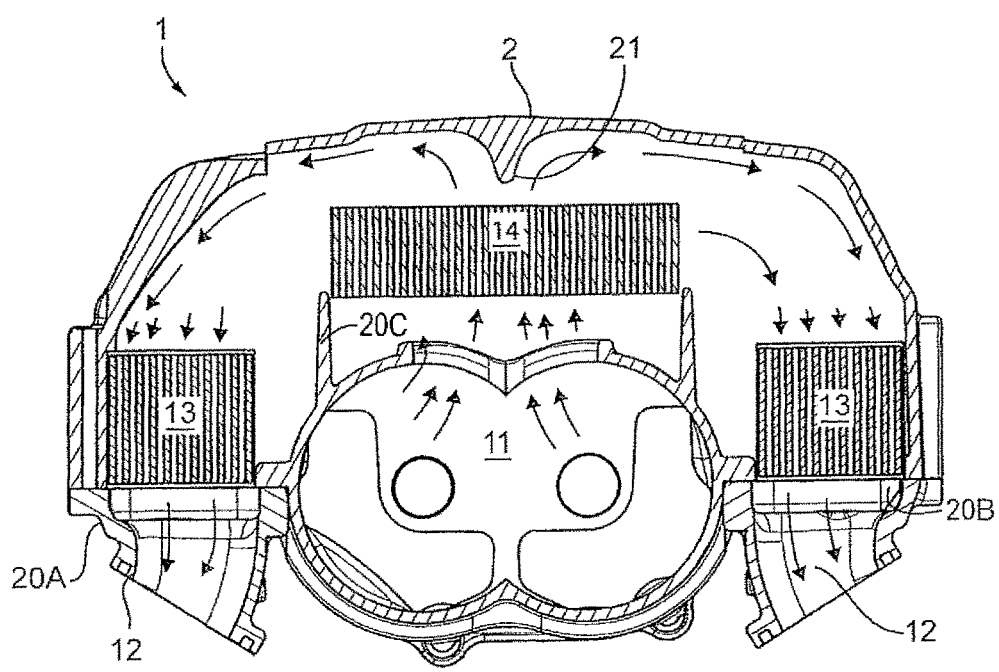
FIG. 10 is a partial sectional view illustrating air flow from a supercharger through a top intercooler and two side intercoolers.
Figure 11:
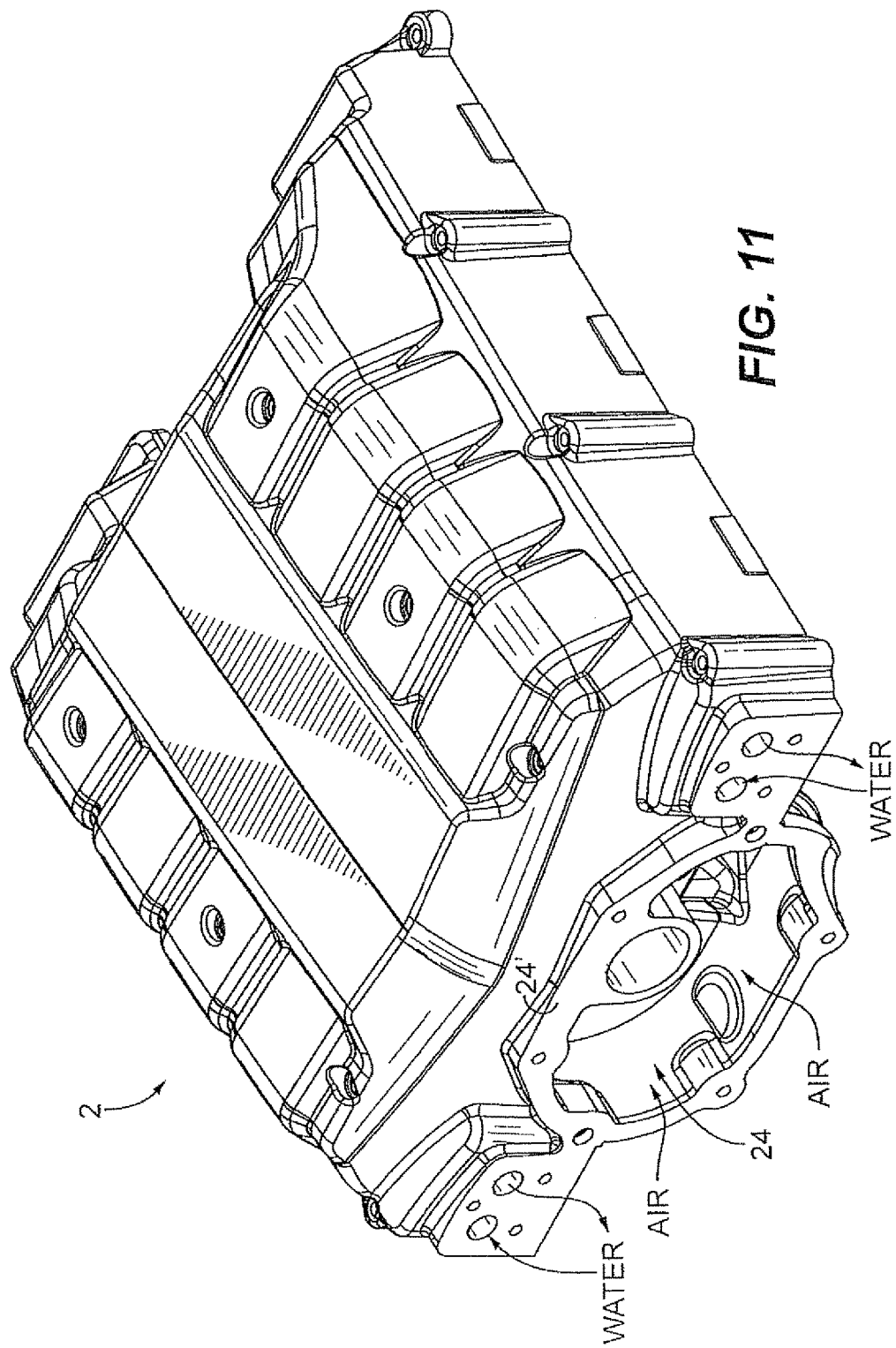
FIG. 11 front perspective view of the monolithic continuous unitary casting noting air flow and coolant (water) flow.

As will be understood from the disclosure, and particularly from FIGS. 5 and 6, as a substantial convenience central intercooler 14 may be accessed in a slide-out manner from the rear of monolithic housing 2 without removal of monolithic housing 2 from any other engine component. In process, for assembly or disassembly, this is a substantial time savings and quality improvement. Specifically, there is no damage to any seal (which is not effective by sliding removal) between the monolithic housing 2, and runners 12, 12, or any other component. The rear door access portal 11A for supercharger rotor assembly 11 need not be opened for changing or inspecting central intercooler 14. Additionally, as a substantial benefit, side intercooler assemblies 13, 13 may also be inspected via angled viewing through (via) the central intercooler portal 23, providing an enhanced and very fast review. An inspection light (not shown) can be positioned within portal 23 (see FIG. 6) and each side intercooler 13, 13 can be inspected without the need to remove monolithic continuous unitary casting 2 unless necessary.

Regarding the position of monolithic housing 2 positioned within hood opening 3B; during use, variable rate air flow flows over a pair of undulating outer surface region 27, 27 for monolithic housing 2, spaced by a smooth central surface region 28. Undulating outer surface regions 27, 27 receive deflected air flow from central surface region 28, which deflects laterally (to the side) due to a curved and slanted/angular arrangement. Additionally, any direct air flow (from the front of a vehicle) undulates over undulating out surface regions 27, 27 and mixes with the laterally deflected air flow. This combined air flow intermixes for an enhanced convection heat transfer from the surface of monolithic housing 2 during vehicle transfer.

Additionally, it will be understood that the rear-portion of monolithic housing 2 (see FIGS. 5, 6, 7, 12, 15-18, and 21-22) splits into two side 'boot' type portions (shown but not numbered) proximate the ends of relating left and right intercooler portals 20A, 20B and intakes and cylinders for the respective engine. In this way, it will be understood that the laminar air flow extends to the entire cylinder head bank and to the cylinder heads and is not detrimentally affected despite the split shape. This arrangement additionally allows a convenient sealing between respective air runners 12, 12 and monolithic housing 2, a convenient shape, and reduced weight for the overall engine and induction assembly 1.

It will be further understood that the proposed assembly and system, while maximizing the surface area for convective cooling and inner plenum surface for air flow and housing, the monolithic unitary housing may be formed in related, but different functional shapes without departing from the scope and spirit of the present invention. For example, external air-flow fins may be added to the external housing surface to provide more ambient air flow surface area during vehicle movement, and these air flow fins may be shaped in numerous ways, (parallel rows, series of irregular bumps, mixture of rows and ridges, etc.). For a second example, the monolithic unitary housing may be provided in differing widths and lengths to accommodate different engine block and intake arrangements or for use with different intercooler shapes. For a further example, the proposed monolithic unitary housing may be adapted to different cylinder arrangements (4-cylinder, 6-cylinder, 8, cylinder 10-cylinder, 12-cylinder, etc) all within the scope and spirit of the present invention. As a result, there is no single exclusive outer surface shape or profile to the present, rather there are numerous alternatives that will meet the same functional claims and goals as noted herein.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

REFERENCE DESIGNATOR LISTING

1: induction assembly and system for a supercharged internal combustion engine
2: monolithic continuous unitary casting housing
3: hood
3A: hood vents
3B: hood opening
4: water pump
5: water/coolant reservoir
6: heat exchanger to ambient air
7: tubing
8: fire wall structure
9: water manifold
10: water cross over manifold 11: rotor assembly
11A: access portal (for pressurized air)
12, 12: runners (2)
13, 13 side intercooler assembly (2)
14: central intercooler assembly
15: nose drive assembly for super charger
15A: cover door
16: air intake
20A: 20B left side and right side intercooler portals
21: central rib interior
22: lateral ribs
22: lateral ribs interior
23: central intercooler portal
24': super charger rotor portal
24": super charger air intake portal
25: super charger rotor support ribs
26: bolt holes, collectively
27, 27: undulating outer surface region (2)
28: smooth central surface region
30: water flow system
35: cylinder head(s)
40: cylinder block
41: block assembly

What is claimed is:

1. An induction assembly for a supercharged internal combustion engine of a vehicle, said induction assembly comprising:
 a monolithic unitary housing member;
 said monolithic housing member bounding a bounded super charger rotor portal, a super charger access portal, a first central intercooler portal, and opposed second and third intercooler portals;
 said monolithic housing member forming a bounded air distribution plenum in a flow communication from said super charger rotor portal through said super charger access portal into said first central intercooler portal and to each said second and third intercooler portal;
 a super charger having a rotor assembly operative to produce a pressurized air through said super charger access portal;
 a first central intercooler assembly in said air distribution plenum receiving said pressurized air and passing a first cooled air to said air distribution plenum;
 said air distribution plenum splitting and passing said first cooled air to a second side intercooler assembly and an opposed third side intercooler assembly;
 said second and said third side intercooler assemblies passing a second cooled air to opposed air inlet members external to said monolithic unitary housing member;
 a central air guidance rib projecting inwardly along an airflow pathway from an inner surface of said monolithic housing member and toward said first central intercooler assembly operative to split a laminar airflow toward respective said second and said third side intercooler assemblies; and
 a plurality of lateral air guidance ribs projecting inwardly along said airflow pathway, and perpendicular to said central air guidance rib, being operative for guiding a laminar airflow from said first central intercooler to respective said second and third side intercooler assemblies.

2. The induction assembly, according to claim 1, further comprising:
 an operative water flow system in a parallel flow communication with each said first central intercooler assembly, said second side intercooler assembly, and said third side intercooler assembly.

3. The induction assembly, according to claim 1, further comprising:
 at least one through bolt hole having a continuous defined side wall extending from a top surface to a bottom surface of said induction assembly and through said airflow pathway, whereby said monolithic induction assembly is secured during an installation thereof without disturbance of said laminar air flow.

4. The induction assembly system, according to claim 3, further comprising:
 said first central intercooler assembly is operatively slidably removable from said bounded continuous plenum through said first central intercooler portal.

5. The induction assembly system, according to claim 4, further comprising:
 a plurality of undulations on an exterior surface of said monolithic continuous unitary housing member.

6. The induction assembly system, according to claim 4, further comprising:
 a vehicle hood of said vehicle having a bounded opening proximate said monolithic unitary housing member;
 said plurality of undulations on said exterior surface of said monolithic unitary housing member extending through said bounded opening; whereby during a movement of said vehicle an airflow over said exterior surface is improved.

7. A method for assembly of an induction system for a supercharged internal combustion engine, comprising the steps of:
 providing a monolithic unitary housing member;
  said monolithic housing member bounding a bounded super charger rotor portal, a super charger access portal, a first central intercooler portal, and opposed second and third intercooler portals;
  said monolithic housing member and forming a bounded air distribution plenum in a flow communication from said super charger portal through said super charger access portal and to each said second and third intercooler portal;
  said monolithic housing member having a central air guidance rib projecting inwardly along an airflow pathway from an inner surface thereof and toward said super charger access portal and a plurality of lateral air guidance ribs projecting inwardly along said airflow pathway and perpendicular to said central air guidance rib;
 providing a first central intercooler assembly in said first central intercooler portal;
 providing a second and a third side intercooler assembly in said respective second and third intercooler portals; and
 inserting a super charger having a rotor assembly into said supercharger rotor portal being operative to produce a pressurized air through said super charger access portal;
 inserting a first central intercooler assembly in said air distribution plenum through a bounded first intercooler access portal and operative for receiving said pressurized air and passing a first cooled air to said bounded air distribution plenum;
 inserting a second and a third opposed intercooler assembly in said air distribution plenum through opposed intercooler portals;
 operating said rotor assembly and producing said pressurized air through said supercharger access portal and through said first central intercooler assembly and passing said first cooled air to said bounded air distribution plenum;

splitting said first cooled air along a central rib member and passing a laminar first cooled air to a second side intercooler assembly and an opposed third side intercooler assembly along said plurality of lateral air guidance ribs projecting along said airflow pathway; and operating said second and said third side intercooler assemblies and cooling said first cooled air into a second cooled air and passing said second cooled air in a laminar manner to opposed sets of a plurality of air inlet members external to said monolithic unitary housing member.

8. The method for assembly of an induction system, according to claim 7, further comprising the steps of:

providing an operative water flow system in a parallel flow communication with each said first central intercooler assembly, said second side intercooler assembly, and said third side intercooler assembly, thereby providing a cooling to each respective intercooler assembly.

\* \* \* \* \*